United States Patent
Dittman, Sr.

(10) Patent No.: US 6,792,814 B2
(45) Date of Patent: Sep. 21, 2004

(54) FLOWMETER

(75) Inventor: Frank W. Dittman, Sr., Bridgewater, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 10/411,065

(22) Filed: Apr. 10, 2003

(65) Prior Publication Data

US 2004/0025586 A1 Feb. 12, 2004

Related U.S. Application Data

(60) Provisional application No. 60/371,458, filed on Apr. 10, 2002.

(51) Int. Cl.[7] .................................................. G01F 1/37
(52) U.S. Cl. .................................................. 73/861.52
(58) Field of Search ........................ 73/861.52, 861.61, 73/861.63, 861.64, 861.58, 861.53, 861.56, 861.62, 730, 861.354, 861.355, 861.356, 861.357, 778

(56) References Cited

U.S. PATENT DOCUMENTS

| | | | | |
|---|---|---|---|---|
| 3,927,565 A | * | 12/1975 | Pavlin et al. | 73/861.355 |
| 4,165,632 A | * | 8/1979 | Weber et al. | 73/54.09 |
| 4,249,164 A | * | 2/1981 | Tivy | 73/861.08 |
| 4,860,594 A | * | 8/1989 | Hammond et al. | 73/861.42 |
| 4,986,135 A | * | 1/1991 | Corser et al. | 73/861.42 |
| 5,672,832 A | * | 9/1997 | Cucci et al. | 73/861.52 |
| 6,481,292 B1 | * | 11/2002 | Reich | 73/730 |

OTHER PUBLICATIONS

Aaliant Strain Gage Target Flowmeter.

* cited by examiner

*Primary Examiner*—Edward Lefkowitz
*Assistant Examiner*—Takisha Miller
(74) *Attorney, Agent, or Firm*—Wolff & Samson PC

(57) ABSTRACT

A flowmeter is provided for measuring the flow rate of liquids, particularly liquids with solids suspended therein, or corrosive liquids, by measuring a flow without any contact between the sensing elements of the flowmeter and the liquid. The flowmeter is connected to upstream piping and downstream piping. Interconnected with the upstream piping is a first expansion joint, a tapered nozzle and a second expansion joint of smaller diameter. Extending from the second expansion joint is a reversed tapered nozzle connected to the downstream piping. One or more strain gauges, or a strain gauge assembly, is interconnected with the second expansion joint. The force of flow on the tapered nozzle creates a higher velocity flow within the tapered nozzle and then an expansion thereafter. This tends to urge the expansion nozzle, and the second expansion joint connected thereto, towards the upstream piping. Such movement is measured by th7e strain gauges.

26 Claims, 4 Drawing Sheets

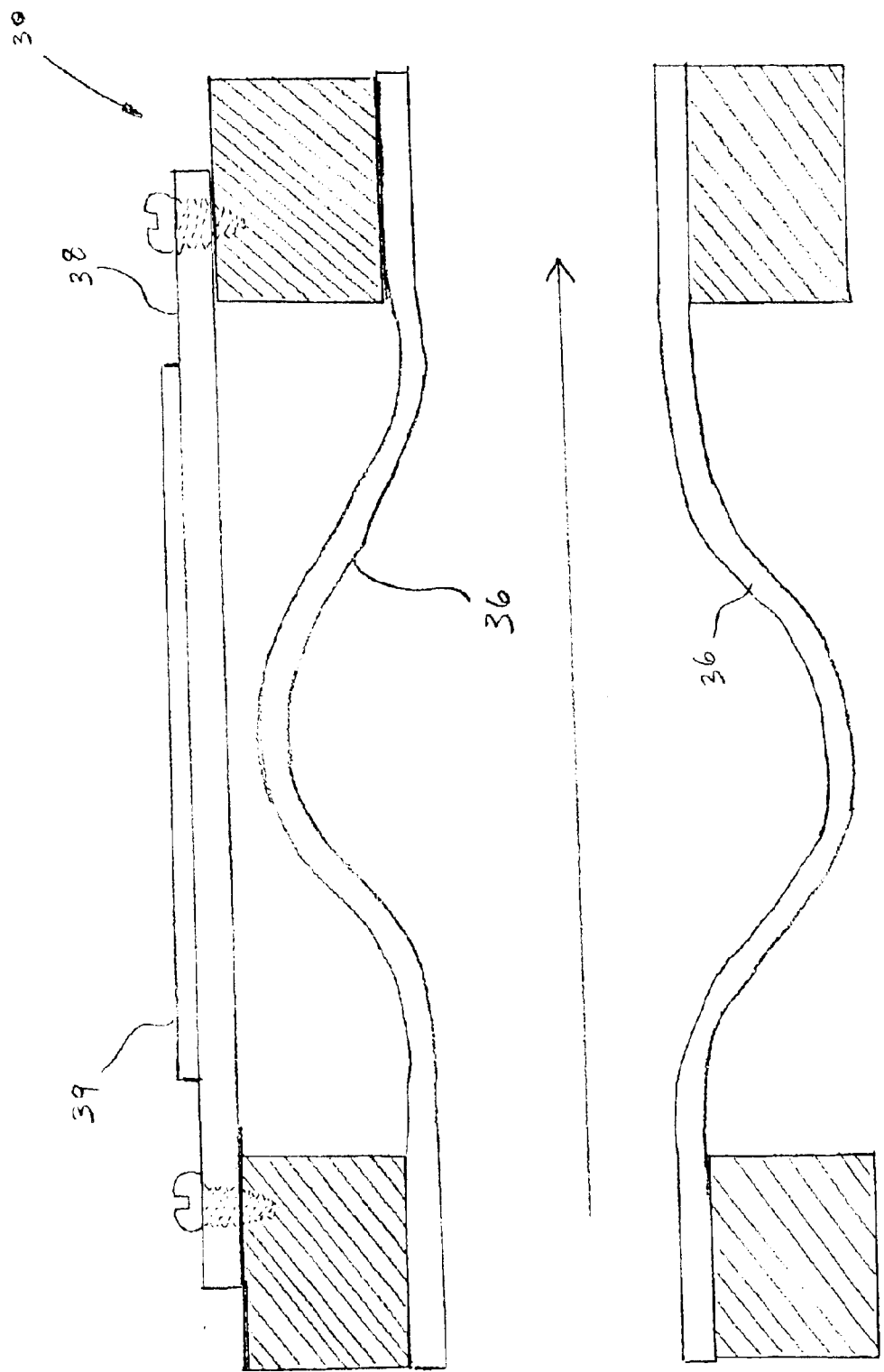

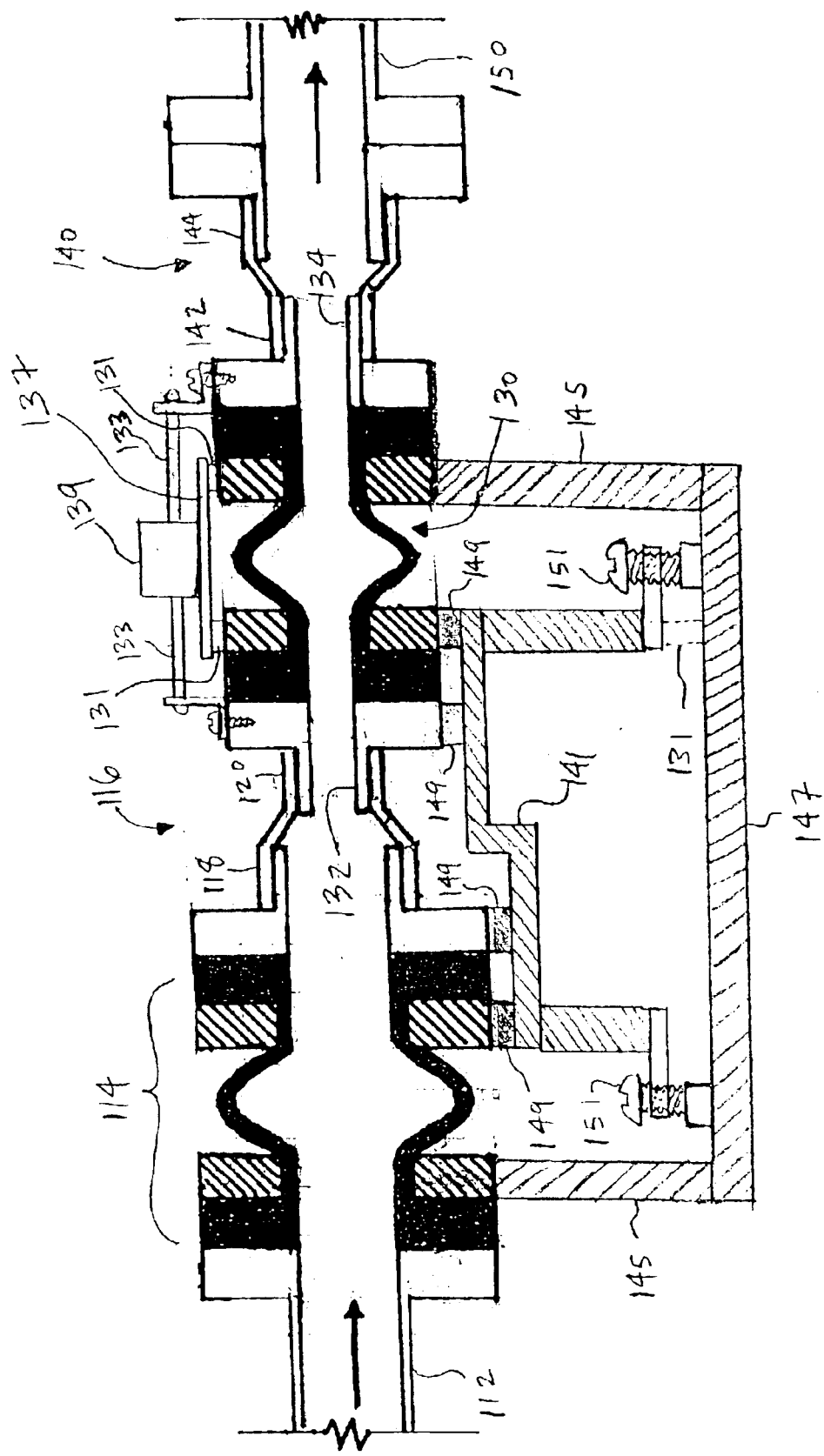

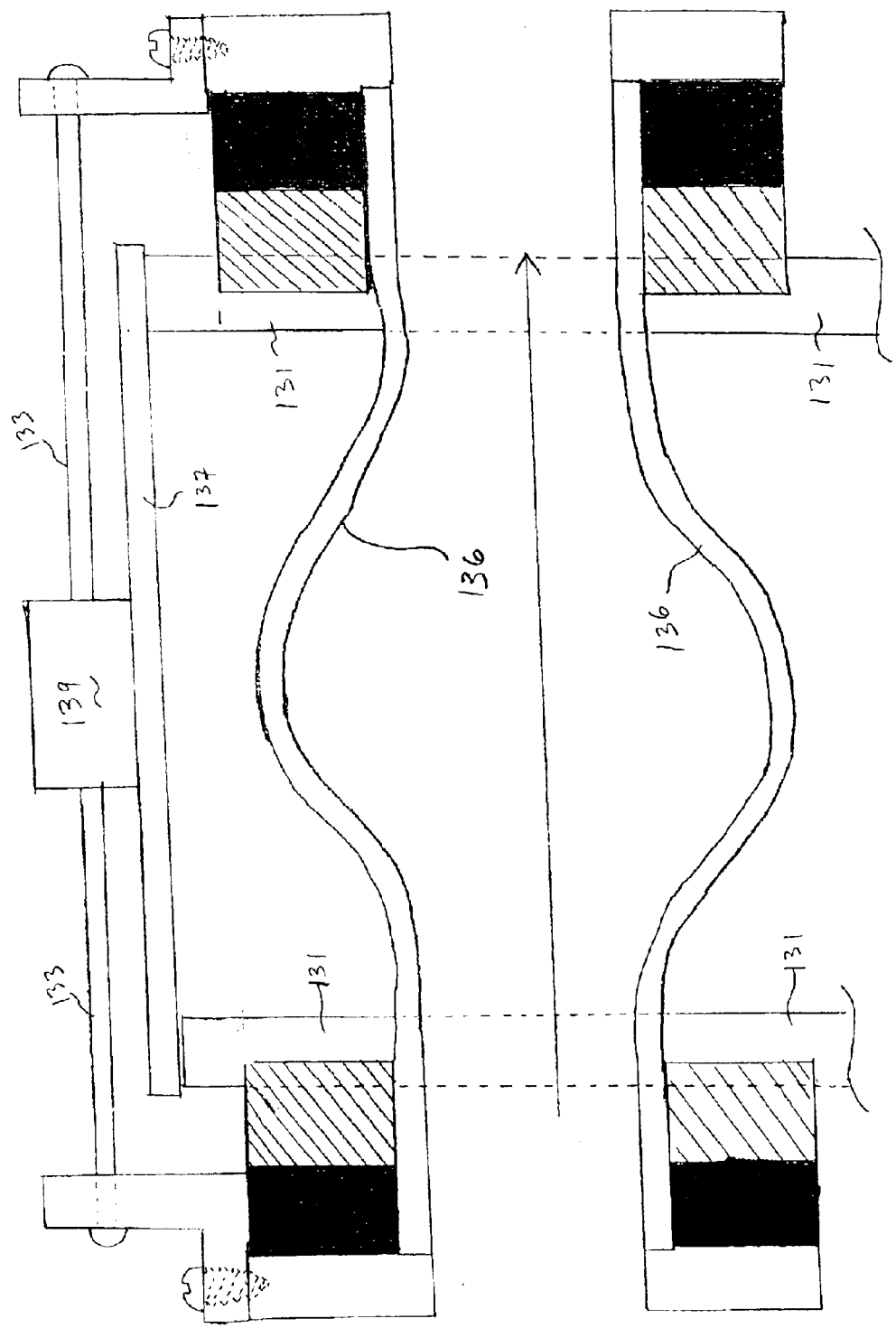

FLOWMETER

RELATED APPLICATIONS

This application claims the benefit of U.S. Provisional Application Serial No. 60/371,458 filed Apr. 10, 2002, the entire disclosure of which is expressly incorporated herein by reference.

BACKGROUND OF THE INVENTION

1. Field of the Invention

The present invention generally relates to a flowmeter for measuring the flow rate of a liquid, or a liquid with suspended solids, through a pipe system without physical contact between the liquid and the measuring elements of the flowmeter.

2. Related Art

There are numerous types of flowmeters for measuring the flow rate of liquid, but no suitable instrument exists for measuring the flow rate of liquid-solid suspensions or measuring the flow rate of corrosive liquids, or liquids with corrosive solids. Prior flowmeters are not suitable for such applications because the flowmeters, or portions thereof, generally make contact with the liquid, and where liquid-solid suspensions exist, or the liquid or solid is corrosive, interference is created with any internal propellers, rotors or tubing that may comprise such flowmeters. As such, when used in connection with liquid-solid suspensions, or corrosive liquids or corrosive suspended solids in the liquid, existing flowmeters accumulate solids, are corroded, or both, causing them to lose calibration, and ultimately become completely inoperable.

What is desired, but has not heretofore been developed, is a flowmeter that is capable of measuring the flow rates of liquids, which may include particulate suspended solids, and wherein the liquids or solids, or both, may be corrosive. The flowmeter of the present invention accomplishes these objectives because there is no contact between the measuring elements of the flowmeter and the liquid whose flow rate is being measured.

SUMMARY OF THE INVENTION

The present invention provides a flowmeter for measuring the flow rate of liquids or liquid-solid suspensions within a pipeline, without physical contact between the liquid or liquid-solid suspension and the measuring elements of the flowmeter. The measuring elements of the flowmeter are isolated from the liquid or liquid-solid suspension. The flowmeter can be used for measuring the flow rate of a liquid or liquid-solid suspensions wherein the liquid and/or suspended solid is corrosive. The flowmeter includes flexible couplings and a strain gauge or strain gauge assembly.

The present invention relates to a flowmeter for measuring the flow rate of liquids, or liquid-solid suspensions in which liquids and/or suspended solids may be corrosive. The flow rate is measured without any physical contact between the measuring components of the flowmeter and the liquid or liquid-solid suspension. The flowmeter is connected between upstream and downstream piping. A first flexible coupling is connected to the upstream piping and is preferably the same diameter as the upstream piping. A reducing coupling and a second flexible coupling of smaller diameter is connected downstream of the first flexible coupling. Extending from the second flexible coupling is a reverse reducing coupling, followed by the downstream piping of the same diameter as the upstream piping. One or more strain gauges are interconnected with the second flexible coupling. The one or more strain gauges can be attached to one or more rigid strips which can be attached in the direction of flow to the upstream and downstream flanges of the second flexible coupling. The force of flow on the first reducing coupling creates a higher velocity flow in the outlet of the first reducing coupling and within the second flexible coupling. The resulting upstream momentum force tends to urge the first reducing coupling, and the second flexible coupling connected thereto, towards the upstream piping. Such movement is translated to the rigid strips or bolts connected across the second flexible coupling and the resulting force is measured by the one or more strain gauges attached to the rigid strips or bolts. The second reducing coupling is reversed so that its larger diameter faces downstream and is preferably the same diameter as the upstream piping. The flowing liquid or liquid-solid suspension thus expands to fill the downstream piping at the same average velocity as that in the upstream piping.

In one embodiment of the present invention, a strain gauge assembly is connected to flanges of the second flexible coupling. The strain gauge is tensional by movement of the second flexible coupling caused by fluid flow. The strain gauge can be supported by a plate with support legs to prevent vertical movement of same. The support legs and plate are adjustable, allowing the strain gauge assembly to be supported at desired heights. The flexible couplings can also be supported.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The present invention relates to a flowmeter for measuring flow rates of liquids or liquid-solid suspensions, based on changes in the fluid momentum caused by piping cross-section changes. The present invention is suitable for measuring the flow rate of liquids, or liquid-solid suspensions in which the liquid and/or solid may be corrosive, without physical contact between the liquid or liquid-solid suspension and the measuring elements of the flowmeter.

Figure 1:
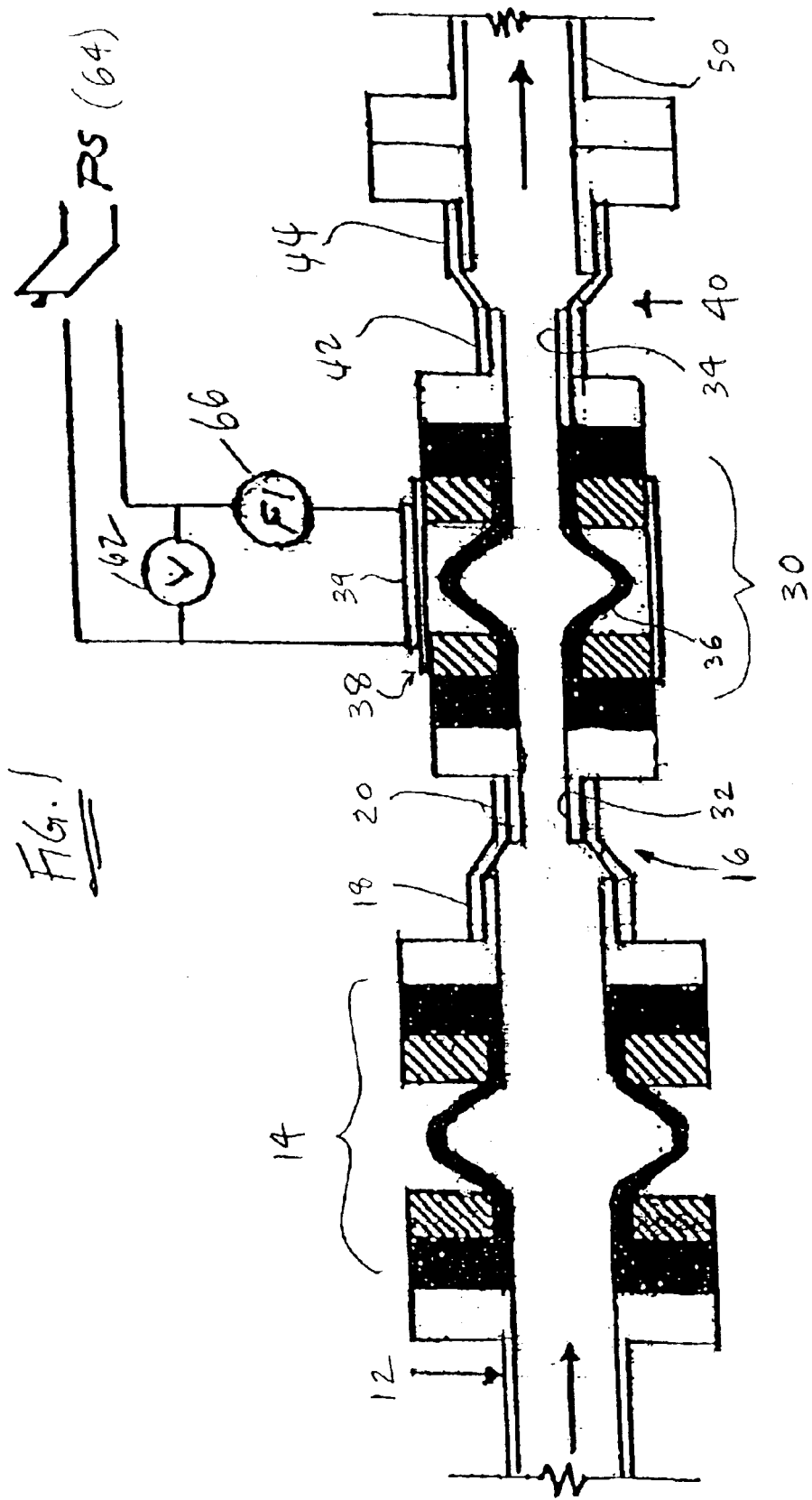
FIG. 1 shows a schematic cross-section of a preferred embodiment the flowmeter of the present invention.
Figure 1:
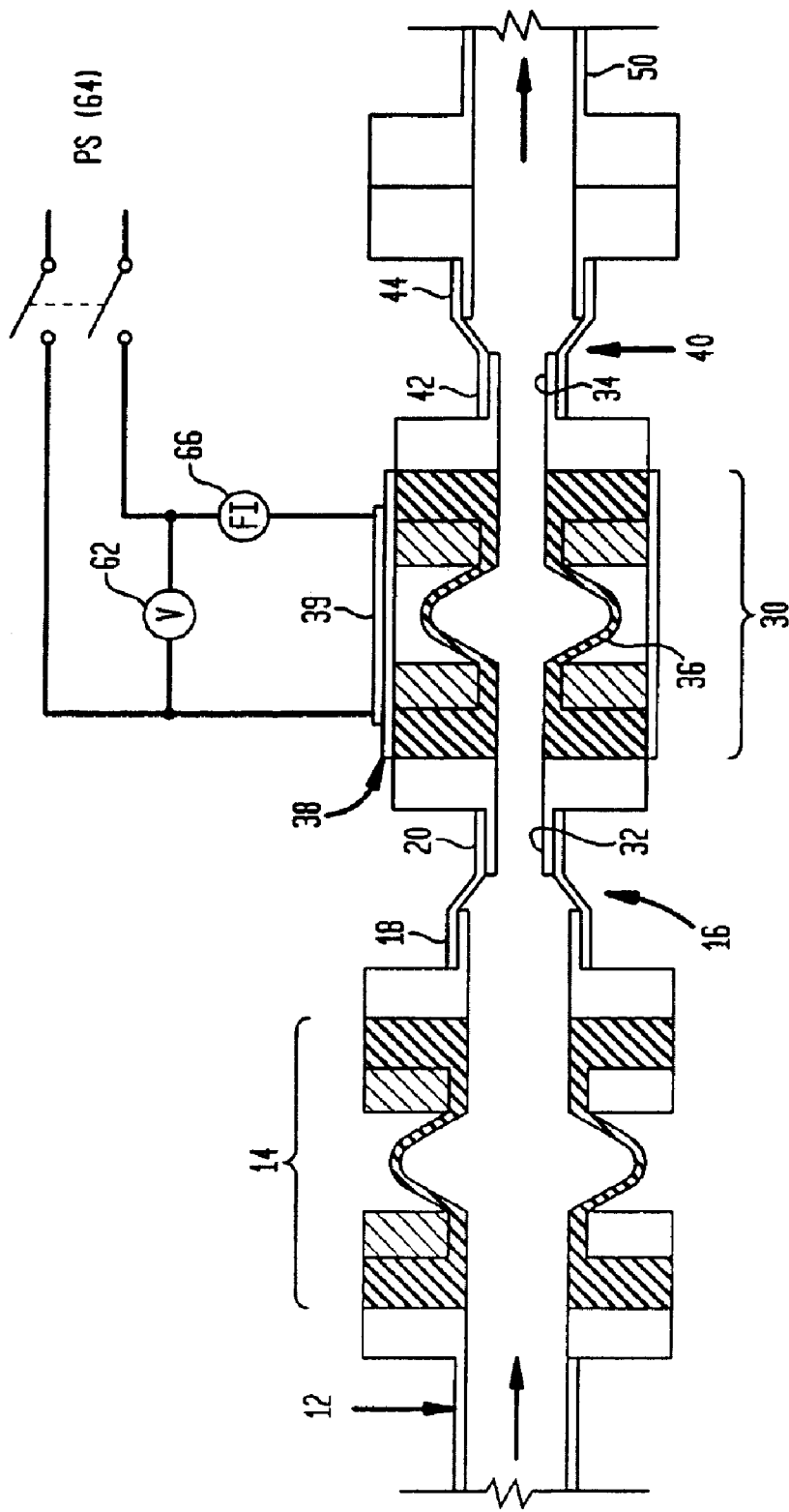

As shown in FIG. 1, a flexible coupling 14 is connected at a first end to upstream piping 12. Such flexible couplings are known in the art, and generally comprise standard pipe fittings coupled together by a flexible material having one or more loops. Rubber, PTFE, or other suitable materials may be used. They are readily available from the piping supply industry. Flexible joints can also be made of metal. It may be desirable to use a flexible coupling that has a porous covering over the flexible material to prevent the lodging of solids in one or more loops formed by the flexible material.

A wide end 18 of a tapered nozzle 16 is interconnected with the downstream end of flexible coupling 14. Such tapered nozzles are also well known in the art. The interconnection between the flexible coupling 14 and the upstream piping 12, as well as that between tapered nozzle 16 and flexible coupling 14, as well as all other piping connections discussed herein, can be made by any means known in the art.

The wide end 18 of tapered nozzle 16 is preferably sized in accordance with the size of the upstream piping 12. Preferably, the tapered nozzle 16 is of circular cross-section, the upstream diameter being larger than the downstream diameter. However, the tapered nozzle 16 could be an eccentric tapered nozzle having a horizontal lower edge and a tapered upper edge.

A second flexible coupling 30 is interconnected with the narrow, downstream end 20 of the tapered nozzle 16. The second flexible coupling 30 is sized in accordance with the size of the narrow, downstream end 20 of the tapered nozzle 16. The flexible coupling 30 has an inlet 32 and an outlet 34. A flexible loop 36 allows the inlet 32 to move with respect to the outlet 34. As with the first upstream flexible coupling 14, the second flexible coupling 30 is constructed in accordance with what is known in the art.

An expansion joint 40 can be used to connect the downstream end of flexible coupling 30 with downstream piping 50. Expansion joint 40 includes an upstream narrow end 42 interconnected with the flexible coupling 30 and a wide downstream end 44 connected to downstream piping 50. Preferably, the expansion joint 40 brings the piping size from the size reduced by the tapered nozzle 16 back up to the size of the upstream piping 12.

Figure 2:
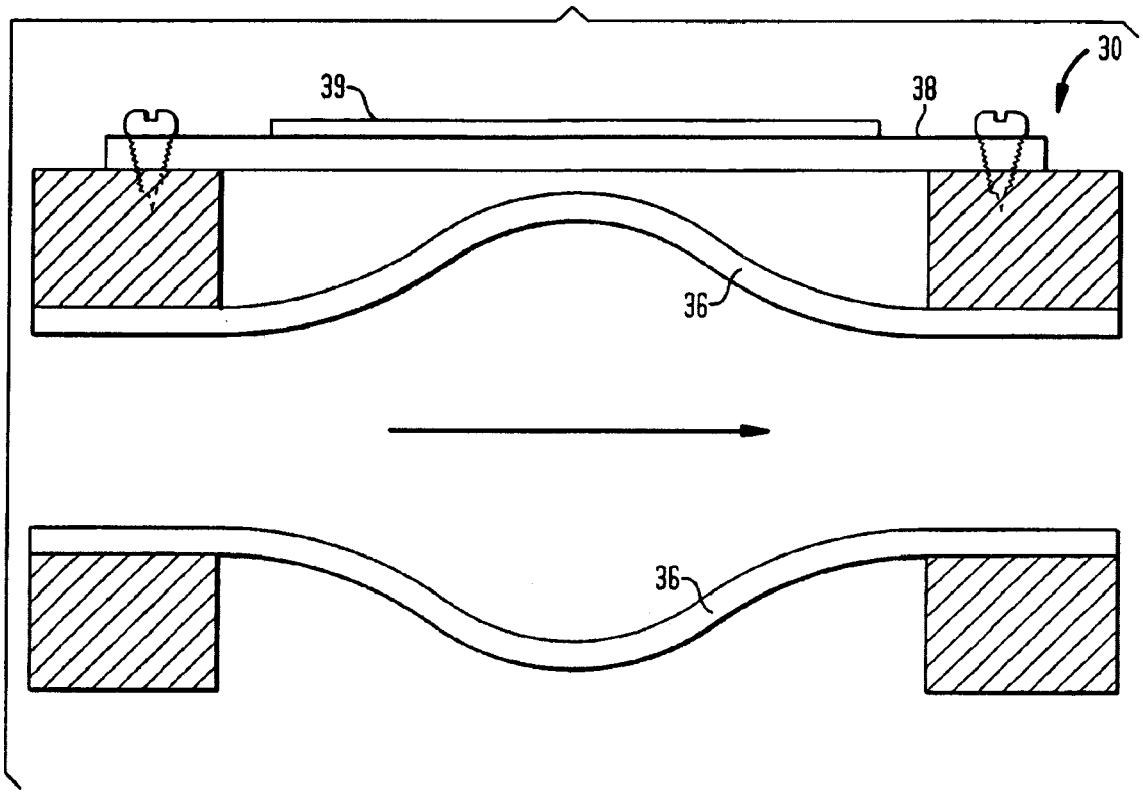
FIG. 2 shows a close-up view of an expansion joint with a strain gauge mounted thereon for use in the flowmeter shown in FIG. 1.

One or more strain gauges 39 or a strain gauge assembly can be interconnected across the second flexible coupling 30 in the direction of flow to span the flexible loop of material 36. Although shown in FIG. 1, this can be seen in greater detail in FIG. 2, which is an enlarged view of the second flexible coupling 30. Preferably, the strain gauge 39 is attached to a rigid strip 38, such as a steel strip, which itself is connected at its ends by welding, adhesive, bolts, or in any other manner known in the art, to the flexible coupling 30. The strain gauge 39 can be mounted on the rigid strip 38 by any means known, such as by adhesive. The adhesive used for mounting the strain gauge 39 on the steel strip 38, and for mounting the steel strip 38 on the flexible coupling 30 can be varied in accordance with what is known in the art. It is important to attach the strain gauge 39 firmly onto steel strip 38, so that both undergo the same percentage of expansion. Any known strain gauge can be used. One such strain gauge is made by J. P. Technologies, Inc. in San Bernardino, Calif. and is sold as Model No. 125BA. It has an electrical resistance of 350 ohms. To increase sensitivity, a plurality of such gauges can be arranged in series. The gauges are small so that many can be positioned on the rigid strip. Any type of strain measuring device can be used including any electrical, mechanical or optical device. For example, an electrical device could employ a Wheatstone bridge in place of the ammeter circuitry shown in FIG. 1.

Optionally, a mechanical strain gauge could be substituted for strain gauge 39. Such a device could include a Berry-type device and a Huggenberger-type device. An optical lever, such as a Martens extensometer, could be used. Alternatives to and/or modifications of these devices are also within the scope of the present invention. It should be noted that any device capable of measuring relative displacement of ends of a flexible coupling 30 could be used to practice the invention.

In operation, liquid or a liquid-solid suspension flowing through the upstream piping 12 flows through the first flexible coupling 14 and through tapered nozzle 16. Thereafter, the liquid flows through the second flexible coupling 30, through the expansion joint 40 and into the downstream piping 50. The flow is constricted by the tapered nozzle 16, causing the velocity of the flow to increase. A resulting upstream momentum force is created which urges the tapered nozzle 16 in an upstream direction, causing a compression of the first flexible coupling 14 and an expansion of the second flexible coupling 30. The expansion of the second flexible coupling 30 is translated to the one or more strain gauges 39 through the one or more steel strips 38.

As shown in FIG. 1, the strain gauge 39 is interconnected with an electric power supply 64 (10 to 12 volts DC), in addition to a voltmeter 62 (0 to 50 millivolts DC) and an ammeter or flow indicator 66. A flow recorder (not shown) can be interconnected with the ammeter 66 to record flow as desired. Maximum electric current reading of the ammeter 66 occurs at zero flow rate. As the flow rate increases from zero, the steel strip 38 and the strain gauge 39 are subject to tensile force, which increases the resistance of the strain gauge 39 and causes the ammeter 66 reading to decrease. Various readout devices known in the art can be utilized as desired, such as the Model 2010 Short Depth Voltage Meter, manufactured by DIGITEC of Lancaster, Pa.

Figure 3:
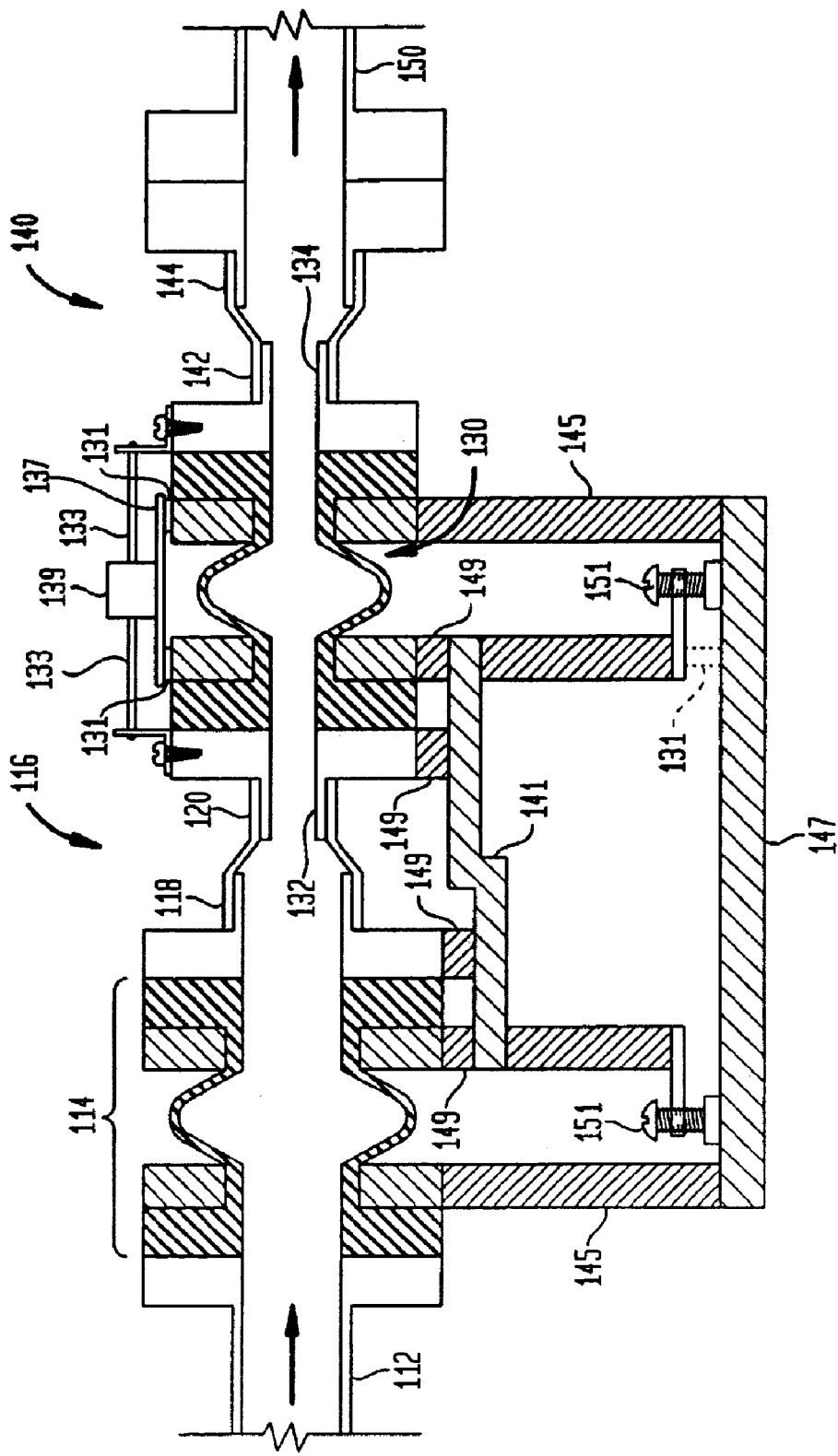
FIG. 3 shows another embodiment of the flowmeter shown in FIG. 1, using a strain gauge assembly.

FIG. 3 shows a flowmeter that uses a strain gauge assembly 139. The strain gauge assembly 139 is connected to the second flexible coupling 130 by two bolts 133, which also support and align the strain gauge assembly 139. The strain gauge assembly 139 is also supported by a plate 137 having supports 131 extending outboard of flexible coupling 130 and down to base plate 147. Any number of supports 131 can be used, but preferably, four supports are provided and connected to the base plate 147. Additionally, the supports 131 can be adjustable in height, so that the position of the plate 137 can be adjusted as desired. The supports 131 and plate 137 prevent vertical movement of the strain gauge assembly 139, which can introduce measurement errors The strain gauge assembly comprises four electrical resistors connected in a square Wheatstone bridge arrangement. A power supply is connected to the ends of the bridge, and a millivoltmeter to the other two corners. One of the four resistors is the strain gauge; stretching it causes a reading on the millivoltmeter proportional to the stress. An example of an acceptable strain gauge for use in the strain gauge assembly 139 is the Model SML strain gauge manufactured by Interface, Inc., of Scottsdale, Ariz. It has a range of 0 to 5 pounds, The base plate 147 also supports fixed supports 145, which extend upward to the upstream flange of flexible coupling 114 and the downstream flange of flexible coupling 130. An adjustable support 141 extends upward from base plate 147 to the downstream flange of flexible coupling 114 and the upstream flange of flexible coupling 130. Additionally, bolts 151 can be provided to allow adjustment of the height of support 141. Frictionless surfaces 149 (created by PTFE tape, machined graphite, etc.) are preferably used where the flexible couplings 114 and 130 rest on support 141. The horizontal movement of the flexible couplings during operation is only a few thousandths of an inch, but any friction could cause error. Importantly, the base plate 147, fixed supports 145, adjustable support 141, frictionless surfaces 149, and adjustment screws 151 can also be used with the embodiment of the flowmeter shown in FIG. 1. The base plate 147 and the supports extending therefrom, including support 141 and plate 137, serve to prevent sagging or other vertical movement, which could skew the strain gauge or strain gauge assembly reading. Further, the adjustments can be utilized to zero out the strain gauge or strain gauge assembly prior to making measurements, so that the strain gauge measures no strain.

Figure 4:
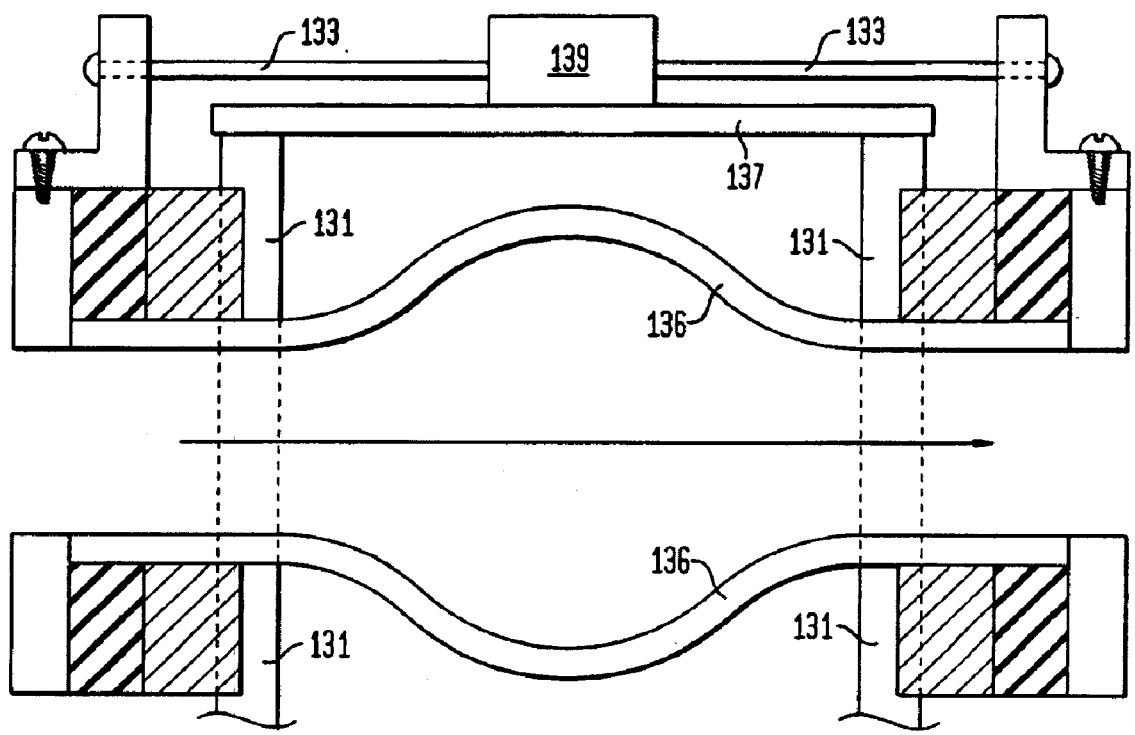
FIG. 4 shows a detail of the mounting of the strain gauge assembly shown in FIG. 3.

FIG. 4 shows a detail of the mounting of the strain gauge assembly shown in FIG. 3. The strain gauge 139 is interconnected with and supported over the flexible coupling 130 by bolts or rods 133. The bolts 133 can be connected to the flanges of the flexible couplings 130 by any acceptable hardware, such as L-shaped brackets or screws. The bolts 133 can be interconnected with the stain gauge 139 by threadable engagement. The plate 137 provides vertical support for the strain gauge 139. Preferably, the supports 131 allow for adjustments to the height of the plate 137. Any number of supports 131 can be provided. Further, any configuration for supporting the strain gauge 139 is considered within the spirit and scope of the present invention.

Importantly, the present invention allows for the flow of liquid in a pipe system to be measured without any contact between a measuring device and the liquid. Rather, the present invention takes advantage of the effect of the increased fluid velocity on flexible couplings when flowing through a tapered nozzle. This reaction can be measured by means of a strain gauge and correlated directly to flow rate. As such, the present invention has great applicability to liquids having solids suspended therein and/or corrosive liquids and/or solids which judgmentally affect existing flowmeters by solid accumulations, loss of calibrations, and ultimately lead to complete inoperability. Indeed, to prevent erosion or corrosion of the tapered nozzle, a lining of rubber, PTFE, or other material resistant to flow conditions can be utilized.

It should be pointed out that, in another aspect of the present invention, a spring can be used instead of the strain gauge and the movement of the spring can be measured. If a spring is used instead of the strain gauge, it could be interconnected directly with the second expansion joint rather than by attachment to a steel strip.

There is a limit to the internal pressure at which the meter can operate; this is imposed by the maximum allowable internal pressure of the flexible couplings. This information can be obtained from the manufacturer of the couplings. It should be noted that temperature could have an effect on the reading through thermal expansion or contraction. Accordingly, it may be desirable to provide insulation or a compensating device for thermal expansion. Also, the flowmeter of the present invention could be used with any size pipe. Currently, flexible couplings of the type used for practicing the invention are available in diameters up to 24 inches.

The momentum force for a given flow rate can be calculated using the following Newton's equation for one-dimensional flow in a horizontal closed conduit:

$$F = \rho Q (V_1 - V_2)/G_c \quad (1)$$

where F=momentum force (pounds of force in horizontal direction), $\rho$=fluid density (pounds per cubic foot), Q=volumetric flow rate (cubic feet per second), $V_1$=upstream velocity (feet per second), $V_2$=downstream velocity (feet per second), and $G_c$=gravitational constant (foot-pounds mass/pounds force times seconds squared).

The present invention was calibrated using known weights of 6 to 36 ounces (0.375 to 2.25 pounds). Results from four trials (weight versus millivolt output) were extremely consistent, giving a range of 1.9 to 11.3 millivolts output. Applying the relationship set forth in Equation 1 to the results of the trials using the flowmeter of the present invention, the following results were obtained:

TABLE 1

| Measured Flow Rate (GPM) | Calculated Force (Pounds) | Meter Reading (Millivolts) | Force Corresponding to Meter Reading (Pounds) |
| --- | --- | --- | --- |
| 12.1 | 0.20 | 1.12 | 0.25 |
| 8.76 | 0.102 | 0.54 | 0.11 |
| 4.09 | 0.020 | 0.08 | 0.030 |

Like any other type of flowmeter, the flowmeter of the present invention should be calibrated under actual conditions to be used.

Having thus described the invention in detail, it is to be understood that the foregoing description is not intended to limit the spirit and scope thereof What is desired to be protected by Letters Patent is set forth in the appended claims.

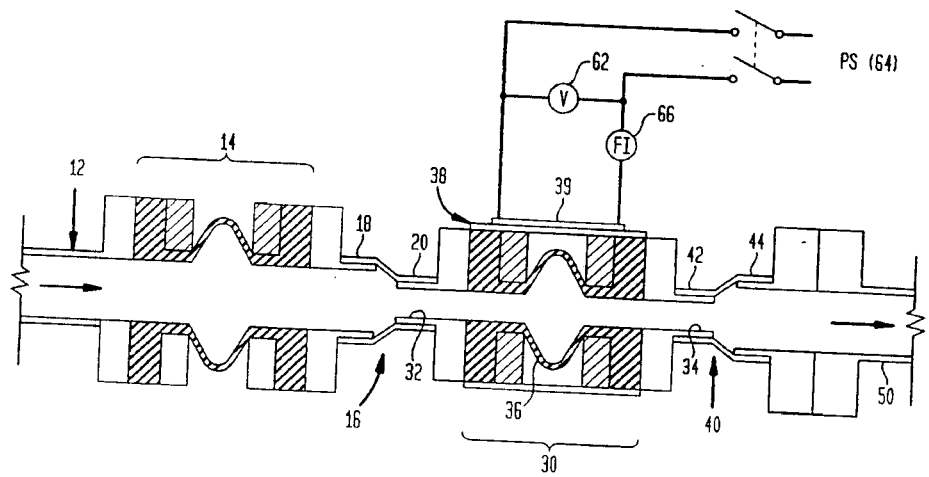

What is claimed is:

1. A flowmeter apparatus comprising:
   an upstream flexible coupling;
   a downstream flexible coupling;
   a tapered nozzle having a first wide end connected to the upstream flexible coupling and a second narrow end connected to the downstream flexible coupling;
   a strain gauge connected to the downstream flexible coupling for measuring strain; and
   means for calculating flow rate based on the strain measured by the strain gauge.

2. The flowmeter of claim 1, wherein the tapered nozzle is moveable upstream or downstream based on flow rates of fluids flowing therethrough.

3. The flowmeter of claim 2, wherein the downstream flexible coupling comprises upstream and downstream flanges interconnected by a flexible material, and the upstream flange moves with movement of the tapered nozzle.

4. The flowmeter of claim 3, wherein the strain gauge is connected between the upstream and downstream flanges of the downstream flexible coupling, and a force is exerted on the strain gauge by movement of the upstream flange of the upstream flexible coupling.

5. The flowmeter of claim 3, wherein a metal strip is connected between the upstream and downstream flanges of the downstream flexible coupling, and the strain gauge is interconnected with the strip for measuring strain in the strip.

6. The flowmeter of claim 5, wherein the metal strip is bolted to the upstream and downstream flanges.

7. The flowmeter of claim 6, wherein the strain gauge is adhered to the metal strip.

8. The flowmeter of claim 4, wherein the strain gauge is connected to first and second threaded rods.

9. The flowmeter of claim 8, wherein the first and second threaded rods are interconnected to the upstream and downstream flanges by brackets.

10. The flowmeter of claim 1, further comprising an ammeter connected to the strain gauge for measuring electrical output of the strain gauge.

11. The flowmeter of claim 10, wherein the electrical output corresponds to tensile force exerted by the downstream flexible coupling on the strain gauge in response movement of the tapered nozzle caused by fluid flow.

12. The flowmeter of claim 11, wherein fluctuations in the electrical output correspond to fluctuations in flow rates in the flowmeter.

13. The flowmeter of claim 4, further comprising a plate for supporting the strain gauge above the downstream flexible coupling.

14. The flowmeter of claim 13, wherein the plate is supported by support legs.

15. The flowmeter of claim 14, wherein the support legs are adjustable to position the plate at a desired height.

16. The flowmeter of claim 1, further comprising an adjustable support for supporting the tapered nozzle, the upstream flexible coupling, and the downstream flexible coupling.

17. The flowmeter of claim 16, further comprising adjustment screws for positioning the support at a desired height.

18. The flowmeter of claim 1, further comprising a second tapered nozzle having a first narrow end connected to the downstream flexible coupling and a wide second end connected to downstream piping.

19. A method for measuring flow rates of fluids comprising:
   providing an upstream flexible coupling;
   attaching a tapered nozzle to the upstream flexible coupling;
   attaching a downstream flexible coupling to the tapered nozzle;
   attaching a strain gauge to the downstream flexible coupling;
   allowing fluid to flow through the flexible couplings and tapered nozzle, the fluid causing the tapered nozzle to move upstream toward the upstream flexible coupling;
   measuring strain levels on the strain gauge caused by the downstream flexible coupling moving in response to upstream movement of the tapered nozzle; and
   calculating flow rates based upon the strain levels.

20. The method of claim 19, wherein the step of measuring strain levels comprises measuring current levels generated by the strain gauge, changes in the current levels corresponding to changes in the flow rates.

21. The method of claim 19, further comprising supporting the strain gauge above the downstream flexible coupling with a support mechanism to prevent vertical movement of the strain gauge.

22. The method of claim 21, further comprising calibrating the strain gauge by adjusting the support mechanism.

23. The method of claim 19, further comprising adjustably supporting the upstream and downstream flexible couplings.

24. A method for measuring fluid flow rate in piping comprising:
   interconnecting first and second flexible couplings connected by a tapered nozzle to piping;
   allowing the tapered nozzle to move in response to fluid flow therethrough;
   measuring strain at the second flexible coupling caused by movement of the tapered nozzle; and
   calculating flow rates based upon the measured strain.

25. The method of claim 24, wherein the step of measuring strain comprises measuring electrical currents generated by a strain gauge in response to movement of the second flexible coupling.

26. The method of claim 24, wherein the step of calculating flow rates comprises converting measured electrical currents to flow rates.

* * * * *

UNITED STATES PATENT AND TRADEMARK OFFICE
CERTIFICATE OF CORRECTION

PATENT NO. : 6,792,814 B2
DATED : September 21, 2004
INVENTOR(S) : Frank W. Dittman It is certified that error appears in the above-identified patent and that said Letters Patent is hereby corrected as shown below:

The Title page should be deleted and substitute therefore the attached title page.

Delete drawing sheets 1-4 and substitute therefore the attached sheets 1-4.

Signed and Sealed this

First Day of November, 2005

JON W. DUDAS
*Director of the United States Patent and Trademark Office*

(12) United States Patent
Dittman, Sr.

(10) Patent No.: US 6,792,814 B2
(45) Date of Patent: Sep. 21, 2004

(54) FLOWMETER

(75) Inventor: Frank W. Dittman, Sr., Bridgewater, NJ (US)

(73) Assignee: Rutgers, The State University of New Jersey, New Brunswick, NJ (US)

(*) Notice: Subject to any disclaimer, the term of this patent is extended or adjusted under 35 U.S.C. 154(b) by 0 days.

(21) Appl. No.: 10/411,065

(22) Filed: Apr. 10, 2003

(65) Prior Publication Data

US 2004/0025586 A1 Feb. 12, 2004

Related U.S. Application Data

(60) Provisional application No. 60/371,458, filed on Apr. 10, 2002.

(51) Int. Cl.[7] ............................................... G01F 1/37
(52) U.S. Cl. ................................................. 73/861.52
(58) Field of Search ........................ 73/861.52, 861.61, 73/861.63, 861.64, 861.58, 861.53, 861.56, 861.62, 730, 861.354, 861.355, 861.356, 861.357, 778

(56) References Cited

U.S. PATENT DOCUMENTS

| | | | | |
|---|---|---|---|---|
| 3,927,565 A | * | 12/1975 | Pavlin et al. | 73/861.355 |
| 4,165,632 A | * | 8/1979 | Weber et al. | 73/54.09 |
| 4,249,164 A | * | 2/1981 | Tivy | 73/861.08 |
| 4,860,594 A | * | 8/1989 | Hammond et al. | 73/861.42 |
| 4,986,135 A | * | 1/1991 | Corser et al. | 73/861.42 |
| 5,672,832 A | * | 9/1997 | Cucci et al. | 73/861.52 |
| 6,481,292 B1 | * | 11/2002 | Reich | 73/730 |

OTHER PUBLICATIONS

Aaliant Strain Gage Target Flowmeter.

* cited by examiner

*Primary Examiner*—Edward Lefkowitz
*Assistant Examiner*—Takisha Miller
(74) *Attorney, Agent, or Firm*—Wolff & Samson PC

(57) ABSTRACT

A flowmeter is provided for measuring the flow rate of liquids, particularly liquids with solids suspended therein, or corrosive liquids, by measuring a flow without any contact between the sensing elements of the flowmeter and the liquid. The flowmeter is connected to upstream piping and downstream piping. Interconnected with the upstream piping is a first expansion joint, a tapered nozzle and a second expansion joint of smaller diameter. Extending from the second expansion joint is a reversed tapered nozzle connected to the downstream piping. One or more strain gauges, or a strain gauge assembly, is interconnected with the second expansion joint. The force of flow on the tapered nozzle creates a higher velocity flow within the tapered nozzle and then an expansion thereafter. This tends to urge the expansion nozzle, and the second expansion joint connected thereto, towards the upstream piping. Such movement is measured by th7e strain gauges.

26 Claims, 4 Drawing Sheets